US011394752B2

(12) United States Patent
Al-Mehdar et al.

(10) Patent No.: US 11,394,752 B2
(45) Date of Patent: Jul. 19, 2022

(54) DEDICATED USER PRIORITY MESSAGE

(71) Applicant: T-Mobile USA, Inc., Bellevue, WA (US)

(72) Inventors: Mohammed Al-Mehdar, Bellevue, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 60 days.

(21) Appl. No.: 16/671,863

(22) Filed: Nov. 1, 2019

(65) Prior Publication Data
US 2020/0145465 A1 May 7, 2020

Related U.S. Application Data

(60) Provisional application No. 62/755,968, filed on Nov. 5, 2018.

(51) Int. Cl.
| *H04L 65/1016* | (2022.01) |
| *H04L 65/10* | (2022.01) |
| *H04L 65/1083* | (2022.01) |
| *H04L 67/14* | (2022.01) |
| *H04W 8/20* | (2009.01) |
| *H04W 72/10* | (2009.01) |
| *H04L 51/226* | (2022.01) |
| *H04W 8/04* | (2009.01) |

(52) U.S. Cl.
CPC ......... *H04L 65/1016* (2013.01); *H04L 51/26* (2013.01); *H04L 65/1006* (2013.01); *H04L 65/1083* (2013.01); *H04L 67/14* (2013.01); *H04W 8/04* (2013.01); *H04W 8/20* (2013.01); *H04W 72/10* (2013.01)

(58) Field of Classification Search
CPC . H04L 65/1016; H04L 65/1083; H04L 67/14; H04L 51/26; H04L 67/306; H04W 8/20; H04W 72/10; H04W 8/04
USPC ......................................................... 709/227
See application file for complete search history.

(56) References Cited

U.S. PATENT DOCUMENTS

| 10,292,197 B1 * | 5/2019 | Bonn .................. H04L 12/1403 |
| 2008/0310599 A1 * | 12/2008 | Purnadi ................ H04M 3/5116 379/37 |
| 2012/0307844 A1 * | 12/2012 | Bollapalli ............. H04J 3/0638 370/503 |

* cited by examiner

*Primary Examiner* — David R Lazaro
*Assistant Examiner* — Zia Khurshid
(74) *Attorney, Agent, or Firm* — Lee & Hayes, P.C.

(57) ABSTRACT

When a user equipment (UE) registers with an Internet Protocol Multimedia Subsystem (IMS), a serving call session control function (S-CSCF) of the IMS can obtain user profile information associated with the UE from a Home Subscriber Server (HSS). The user profile information may include a priority indicator, such as an indication that a user associated with the UE is a Wireless Priority Services (WPS) user or other high priority user. In that situation, the S-CSCF can inform a proxy call session control function (P-CSCF) of the IMS that the user is a WPS user or other high priority user by sending a dedicated priority message to the P-CSCF, separately from sending a registration confirmation message to the P-CSCF.

14 Claims, 5 Drawing Sheets

DEDICATED USER PRIORITY MESSAGE

RELATED APPLICATIONS

This U.S. patent application claims priority to U.S. Provisional Patent Application No. 62/755,968, entitled "DEDICATED MESSAGE FROM S-CSCF TO P-CSCF CONTAINING SUBSCRIPTION INFORMATION," filed on Nov. 5, 2018, the entirety of which is incorporated herein by reference.

BACKGROUND

Telecommunication networks can become congested, especially during emergencies or crisis situations when large numbers of users are attempting to make calls. To increase the chances that first responders and other critical personnel are able to make and receive calls during such periods of congestion, telecommunication networks can designate certain users as priority users whose calls should be prioritized over calls for other types of users.

For example, Wireless Priority Service (WPS) users can be users associated with emergency response entities, law enforcement entities, public health entities, disaster recovery entities, and/or other types of users who have been authorized to receive prioritized services via a telecommunication network. When a WPS user makes a call, or another caller attempts to call a WPS user, the telecommunication network can prioritize that call over other calls, thereby increasing the chances that the call can be connected.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

A telecommunication network can include an Internet Protocol (IP) Multimedia Subsystem (IMS). An IMS can set up and manage communication sessions for user equipment (UE), such as sessions for voice calls, video calls, or other types of communications. An IMS can have Call Session Control Functions (CSCFs) that can register UEs with the IMS, route messages, and manage communication sessions. The IMS can also have application servers that provide services for the communication sessions, such as services for voice calls, video calls, or other types of communications. For example, the IMS can have a telephony application server (TAS) that provides telephony services, such as services for voice and/or video calls.

When a UE attaches to the telecommunication network, an IMS registration process can occur. During IMS registration, the UE can send a register message to a Proxy CSCF (P-CSCF) in the IMS. For example, the register message can be a Session Initiation Protocol (SIP) REGISTER message. The P-CSCF can forward the register message to an Interrogating CSCF (I-CSCF). The I-CSCF can, in conjunction with a Home Subscriber Server (HSS), assign the UE to a particular Serving CSCF (S-CSCF), and the I-CSCF can forward the register message to that S-CSCF. The S-CSCF can then authenticate the UE with the HSS and/or retrieve user profile data associated with the UE from the HSS. The S-CSCF can also register the UE with the IMS and return a registration confirmation message, such as a "200 OK" message, to the P-CSCF to confirm the UE's registration with the IMS.

Some users of a telecommunication network's services may be considered priority users. The telecommunication network can prioritize handling network traffic for such priority users over network traffic for other general users. For instance, if a network element is under heavy load, the network element can be configured to process network traffic for priority users even if the network element needs to delay or drop network traffic for some or all other types of users. As an example, a telecommunication network can be configured to prioritize traffic for Wireless Priority Service (WPS) users, such as users associated with governmental entities or other emergency personnel, such that calls for WPS users are likely to be connected even if the telecommunication network is congested during an emergency or crisis, or is otherwise congested. User profile data stored at the HSS can indicate which users are WPS users, or other types of priority users.

During IMS registration, the HSS can provide user profile data to an S-CSCF indicating that a particular UE is associated with a priority user. For example, the HSS can send a Server Assignment Answer (SAA) message to the S-CSCF that indicates that a user profile associated with the UE has a high service priority level.

However, there may be no direct interface between the HSS and a P-CSCF that the HSS can use to directly inform the P-CSCF that a UE is associated with a high service priority level. Some systems rely on an S-CSCF using a registration confirmation message, such as a "200 OK" message, to pass along an indication of a service priority level to the P-CSCF, after the S-CSCF has received such an indication from the HSS. For example, when the S-CSCF receives a register message for a UE from a P-CSCF, the S-CSCF can send a Server Assignment Request (SAR) to the HSS, and in response receive user profile information associated with the UE from the HSS in an SAA. The S-CSCF can then reply to the register message by returning a "200 OK" message to the P-CSCF. In these systems, the S-CSCF can pass along any service priority level indicators that were in the SAA by including those service priority level indicators within the "200 OK" message sent to the P-CSCF. As an example, in these systems the S-CSCF can extract a service priority level indicator from an SAA received from an HSS, insert that service priority level indicator into a P-Associated-URI (PAU) header of a "200 OK" message, and send the "200 OK" message as a response to a P-CSCF. Some P-CSCFs can be configured to analyze returned "200 OK"

messages to look for service priority level indicators in PAU headers. If a "200 OK" message returned in response to a UE's register message includes a PAU header that includes a high service priority level indicator, such a P-CSCF can then implement priority services for that UE and/or prioritize traffic for that UE.

However, it can be inefficient for a P-CSCF to look for a high service priority level indicator in each "200 OK" registration confirmation message it receives in response to each IMS register message sent for every UE. In most cases, only a small percentage of users are considered priority users. For example, because generally only certain types of governmental and/or emergency services personnel can qualify as WPS users, in most cases fewer than one percent of a telecommunication network's users are WPS users. Accordingly, fewer than one percent of "200 OK" registration confirmation messages returned to a P-CSCF from an S-CSCF in reply to IMS register messages for UEs would have service priority level indicators identifying those UEs as being associated with WPS users. In this example, over 99% of the time a P-CSCF would waste time and/or computing resources looking for service priority level indicators associated with WPS users in "200 OK" registration confirmation messages that are received from S-CSCFs during IMS registration procedures.

Additionally, if high service priority level indicators or other user profile data are provided by an S-CSCF to a P-CSCF in a "200 OK" registration confirmation message as part of an IMS registration process as described above, the S-CSCF may have no way of informing the P-CSCF about changes to a user's profile or subscription after that IMS registration occurs. For example, if a particular user was not a high priority user when the user's UE registered with the IMS, but the user's subscription is upgraded post-registration so that the user becomes a WPS user or other priority user, there may be no opportunity for the S-CSCF to send a "200 OK" registration confirmation message to the P-CSCF that includes high service priority level indicators or other user profile data that reflect the changes to the user's subscription.

In other systems, a P-CSCF may send a SIP SUBSCRIBE message associated with a UE to an S-CSCF to request that, if the S-CSCF determines from user profile data retrieved from an HSS that the UE is associated with a service priority level for a WPS user or other priority user, the S-CSCF send a SIP NOTIFY message back to the P-CSCF to indicate that the UE is associated with a high priority user. However, this solution can also be inefficient, and can lead to unnecessary signaling. For example, a P-CSCF would need to send a SUBSCRIBE message to an S-CSCF for every UE handled by that S-CSCF, even though relatively few of those UEs may be associated with high profile users and the S-CSCF would accordingly never send back a NOTIFY message for a large majority of the UEs. For instance, if fewer than one percent of UEs are associated with WPS users, then over 99% of a P-CSCF's SUBSCRIBE messages would be unnecessary and never result in a NOTIFY message being returned.

Described herein are systems and methods by which an S-CSCF can inform a P-CSCF when a UE is associated with a high service priority level, without sending unnecessary signaling messages for every UE or requiring the P-CSCF to examine every "200 OK" registration confirmation message it receives to look for a high service priority level indicator. The systems and methods described herein can therefore reduce signaling in the IMS and/or increase the efficiency of the P-CSCF.

Example Environment

Figure 1:
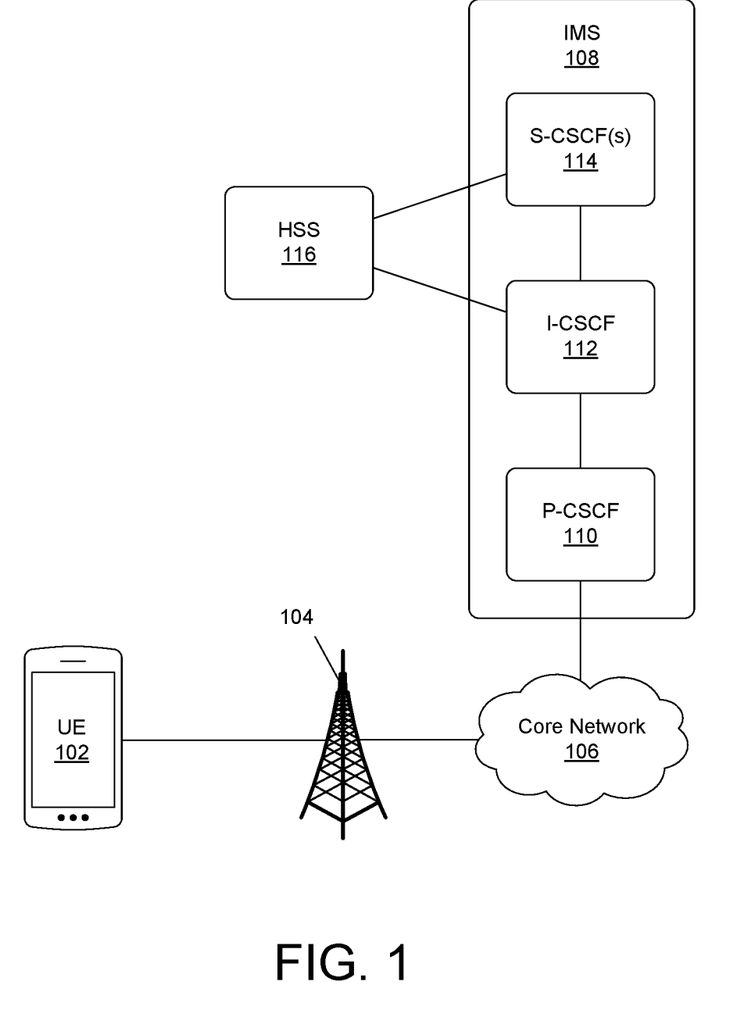
FIG. 1 depicts an example network environment in which user equipment (UE) can connect to a telecommunication network.

FIG. 1 depicts an example network environment in which user equipment (UE) 102 can connect to a telecommunication network to engage in communication sessions for voice calls, video calls, messaging, data transfers, or any other type of communication. In some examples, a UE 102 can be a mobile phone, such as a smart phone or other cellular phone. In other examples, a UE 102 can be any other type of device that can engage in calls or other types of communications through a telecommunication network, such as a personal digital assistant (PDA), a personal computer (PC) such as a laptop, desktop, or workstation, a media player, a tablet, a gaming device, a smart watch, a hotspot, an Internet of Things (IoT) device, or any other type of computing or communication device.

A UE 102 can connect to an access point 104, such as a base station, through which the UE 102 can access a core network 106 of the telecommunication network. The access point 104 and/or core network 106 can be compatible with one or more radio access technologies, protocols, or standards. For example, radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

In some examples, access points 104 can be part of a radio access network linked to the core network 106. For example, an access point 104 can be a base station, such as an evolved Node B (eNB) in an LTE network or a gNB in a 5G network. In other examples, an access point 104 can be a WiFi access point or other type of access point that can be connected to the core network 106 through the Internet or another type of connection.

Gateways or other elements of the core network 106 can link the core network 106 to other networks, such as the Internet or an Internet Protocol (IP) Multimedia Subsystem (IMS) 108. An IMS 108 can set up and/or manage communication sessions for UEs 102 that are connected to the core network 106, such as sessions for voice calls, video calls, messaging, or other types of communications.

An IMS 108 can include Call Session Control Functions (CSCFs) that can perform various operations including registering and authenticating UEs 102 with the IMS 108, routing messages, and managing communication sessions for UEs 102. As described in more detail below, CSCFs can include Proxy CSCFs (P-CSCFs) 110, Interrogating CSCFs (I-CSCFs) 112, and Serving CSCFs (S-CSCFs) 114. In some examples, the terms "CSCF," "P-CSCF," "I-CSCF," and/or "S-CSCF" can refer to other types of IMS nodes, such as nodes of a 5G-specific IMS 108 that may or may not have different names but that are configured to perform the same or similar functions as described herein. Example architecture for a CSCF is illustrated in greater detail in FIG. 3, and is described in detail below with reference to that figure.

The IMS 108 can also include application servers (not shown). While CSCFs can set up and manage communication sessions, application servers can provide services for those communication sessions. For example, an application server can be a telephony application server (TAS) that provides telephony services during a communication session, such as services for voice over LTE (VoLTE) calls or other voice calls, and/or video over LTE (ViLTE) calls or other video calls. In other examples, application servers can include a multimedia telephony application server (M-TAS), a rich messaging server (RMS), rich communication services (RCS) server, or other messaging server, a presence server, a notification server, or any other type of application server.

In some examples, Session Initiation Protocol (SIP) messages can be exchanged between UEs 102, CSCFs, application servers, and/or other network elements. For example, a UE 102 can register with the IMS 108 by sending a SIP REGISTER message to elements of the IMS 108, as will be described in more detail below. As another example, a UE 102 can initiate a call with another UE 102 by sending a SIP INVITE message to the IMS 108.

Some elements of the IMS 108, such as I-CSCFs 112 and/or S-CSCFs 114, can also communicate with a Home Subscriber Server (HSS) 116 that stores user profiles about subscribers and other users who may be associated with UEs 102. In some examples, the HSS 116 can communicate with an I-CSCF 112 and/or a S-CSCF 114 via Diameter protocol Cx interfaces. As used herein, the term "HSS" can refer to an HSS, a Home Location Register (HLR), a combined HSS/HLR, a 5G Unified Data Management (UDM) element and/or other 5G elements that can manage or access user profiles, or any other similar network element that has, or can access, a user profile database and can communicate with I-CSCFs 112 and/or S-CSCFs 114. In some examples, the HSS 116 can be considered part of the core network 106. In other examples, the HSS 116 can be considered part of the IMS 108 or can be considered to be outside the core network 106 and the IMS 108.

Figure 2:
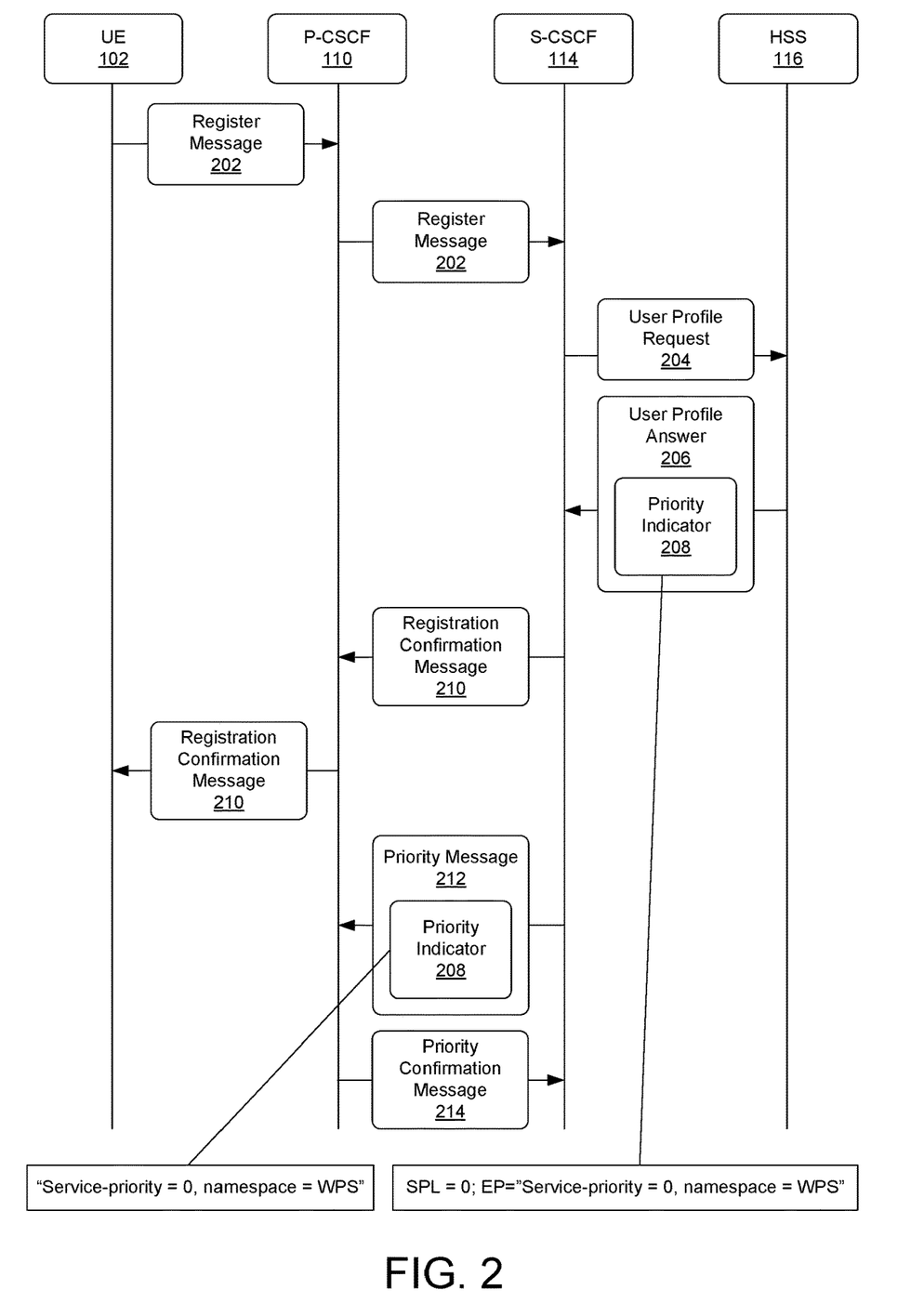
FIG. 2 depicts a sequence of messages that can be exchanged during registration of a UE with an Internet Protocol Multimedia Subsystem (IMS).

FIG. 2 depicts a sequence of messages that can be exchanged between a UE 102, a P-CSCF 110, an S-CSCF 114, and an HSS 116 during registration of the UE 102 with the IMS 108. To register with the IMS 108, a UE 102 can send a register message 202, such as a SIP REGISTER message, to a P-CSCF 110. The P-CSCF 110 can be an entry point into the IMS 108 that routes SIP messages to and/or from UEs 102. For example, the UE 102 can send the register message 202 to the P-CSCF 110 via a connection through an access point 104 and/or a core network 106 linked to the IMS 108.

The register message 202 can include one or more identifiers of the UE 102 and/or a user associated with the UE 102. For example, the register message 202 can include an IP Multimedia Public Identity (IMPU) based on a SIP Uniform Resource Identifier (URI) or a telephone number, such as a Mobile Station International Subscriber Directory Number (MSISDN). In some examples, the register message 202 may also include authorization credentials and other data that can be used during the IMS registration process.

After receiving the register message 202 from the UE 102, the P-CSCF 110 can forward the register message 202 to an S-CSCF 114, which can be a registrar for the IMS 108. Although not shown in FIG. 2, in some examples the P-CSCF 110 may send the register message 202 to an I-CSCF 112, which can in turn forward the register message 202 to the S-CSCF 114. In some examples, the I-CSCF 112 may communicate with the HSS 116 to select or identify an S-CSCF 114 associated with the UE 102, and then forward the register message 202 to the selected S-CSCF 114. In some examples, when the S-CSCF 114 receives the register message 202 associated with the UE 102, the S-CSCF 114 can authenticate the UE 102 with the HSS 116.

As shown in FIG. 2, the S-CSCF 114 can also respond to receiving a register message 202 associated with a UE 102 by sending a user profile request 204 to the HSS 116 that requests user profile data of a user associated with the UE 102. For example, the S-CSCF 114 can indicate which user profile data it is requesting by including one or more identifiers of the UE 102 and/or the user associated with the UE 102, such as an IMPU and/or a corresponding IP multimedia private identity (IMPI), in the user profile request 204. The HSS 116 can, in response, return a user profile answer 206 that includes the requested user profile data associated with the UE. The user profile answer 206 may also include one or more identifiers associated with the UE 102, such as an IMPU and/or IMPI.

In some examples, the S-CSCF 114 and HSS 116 can exchange the user profile request 204 and the user profile answer 206 over a Diameter protocol interface, such as a Cx interface. For example, the user profile request 204 can be a Diameter Protocol Server Assignment Request (SAR), and the user profile answer 206 can be a Diameter protocol Server Assignment Answer (SAA).

If user profile data at the HSS 116 indicates that a user associated with the UE 102 is a priority user, the user profile answer 206 sent by the HSS 116 to the S-CSCF 114 can include a priority indicator 208. For example, a priority indicator 208 can be included in an SAA sent by the HSS 116. A priority user can be a user that subscribes to certain high priority services, such as high priority services that are uncommon among a general user base and/or are only available to users who are associated with certain entities or that have certain qualifications. For example, priority users can be Wireless Priority Service (WPS) users, including as users associated with emergency response entities, law enforcement entities, public health entities, disaster recovery entities, and/or other types of WPS users. A telecommunication network can be configured to prioritize traffic for WPS users, such that calls for WPS users can be connected via the telecommunication network even if the telecommunication network is congested during an emergency or crisis situation, or other congestion situations, and calls for other types of users may be unsuccessful.

A priority indicator 208 may include a service priority level value, text identifying a service priority level and/or a namespace for a type of priority services, and/or any other type of high service priority level indicator. For example, a user profile answer 206 returned by the HSS 116 to the S-CSCF 114 in association can include an indication of a high service priority level (SPL) value, such as SPL=0, where 0 indicates a highest possible service priority level in the IMS 108 and/or the telecommunication network overall. In other examples, any other value or values can indicate a service priority level associated with priority users. The user profile answer 206 may also, or alternately, include an extended profile (EP) tag or other text string, such as EP="Service-priority=0, namespace=WPS." In this example, the text string can identify the service priority level value of 0, and also include a namespace indicator that identifies the user as being a WPS user. In some other examples, the service priority level may also be 0, but the namespace indicator may be different to indicate that a user is another type of high priority user that is to be given the same priority as a WPS user.

The S-CSCF 114 can return a registration confirmation message 210 to the P-CSCF 110 as a reply to the register message 202 associated with the UE 102. In some examples, the registration confirmation message 210 can be "200 OK" SIP response message or other type of confirmation message. For example, after authenticating the UE 102 with the HSS and/or receiving the user profile answer 206, the S-CSCF 114 can return a registration confirmation message 210 to the P-CSCF 110 as a confirmation that the S-CSCF 114 has registered the UE 102 with the IMS 108. The registration confirmation message 210 may include one or more identifiers of the UE 102 or a user associated with the UE 102, so that the P-CSCF 110 can determine that the registration confirmation message 210 is a response to the register message 202 for that UE 102. After receiving a registration confirmation message 210 from the S-CSCF 114, the P-CSCF 110 in turn can forward the registration confirmation message 210 to the UE 102.

The S-CSCF 114 can also determine whether the user profile answer 206 received from the HSS 116 included a priority indicator 208. If the user profile answer 206 did include a priority indicator 208 identifying a service priority level or other data associated with a WPS user or other priority user, the S-CSCF 114 can send a priority message 212 to the P-CSCF 110 that includes the same or a similar priority indicator 208. For example, the priority message 212 can be sent using the SIP MESSAGE method. The priority message 212 may include one or more identifiers of the UE 102 or a user associated with the UE 102, so that the P-CSCF 110 can determine that the priority message 212 is associated with the same UE 102 that sent the register message 202.

In some examples, the priority indicator 208 included in the priority message 212 can be, or be derived from, at least a portion of the priority indicator 208 in the user profile answer 206. For instance, in some examples the S-CSCF 114 can be configured to review the user profile answer 206 for an SPL value, and if the user profile answer 206 includes a SPL value that matches a preconfigured high priority trigger value, the S-CSCF 114 can extract a text string from a corresponding EP tag in the user profile answer 206. The S-CSCF 114 can then insert the extracted text string into the priority message 212 as the priority indicator 208 of the priority message 212. As an example, if the user profile answer 206 includes a priority indicator 208 such as: "SPL=0; EP=' Service-priority=0, namespace=WPS'," the S-CSCF 114 can be configured to recognize the SPL=0 value in the user profile answer 206 as matching a high priority trigger value. The S-CSCF 114 can respond by extracting the text of the EP tag, "Service-priority=0, namespace=WPS," and inserting that text string into the priority message 212 such that the priority indicator 208 of the priority message 212 includes the text string: "Service-priority=0, namespace=WPS." In other examples, the S-CSCF 114 can pass along the full priority indicator 208 received in the user profile answer 206 in the priority message 212, include any other portion of the priority indicator 208 received in the user profile answer 206 in the priority message 212, or insert any other value, text string, flag, and/or other type of data as a priority indicator 208 in the priority message 212.

As noted above, the priority message 212 can be sent by the S-CSCF 114 to the P-CSCF 110 separately from the registration confirmation message 210, in cases in which the UE 102 is associated with a WPS user or other priority user. In some examples, the priority message 212 can be sent using a different type of SIP method or message type than the registration confirmation message 210. For example, while in some examples the registration confirmation message 210 can be a SIP response message with a "200 OK" response code, the priority message 212 can be a SIP MESSAGE request sent using the SIP MESSAGE method.

The P-CSCF 110 can accordingly be configured to process registration confirmation messages 210 it receives from the S-CSCF 114 in response to register messages 202 without reviewing the registration confirmation messages 210 for indications that a user is a WPS user or type other priority user. Instead, when the P-CSCF 110 receives a registration confirmation message 210 for a UE 102, the P-CSCF 110 can proceed with implementing services for the UE 102 under a default processing scheme for non-priority users under an assumption that the UE 102 is not associated with a WPS user or type other priority user, unless and until the P-CSCF 110 also receives a separate priority message 212 associated with that UE 102.

When the P-CSCF 110 does receive a priority message 212 with a priority indicator 208 for a UE 102, the P-CSCF 110 can return a priority confirmation message 214 to the S-CSCF 114. In some examples, the priority confirmation message 214 can also be a SIP response message with a "200 OK" response code. In other examples, the priority confirmation message 214 can be any other type of message. In some examples, the S-CSCF 114 can be configured to, if the S-CSCF 114 does not receive a priority confirmation message 214 from the P-CSCF 110 within a predetermined period of time following when the S-CSCF 114 sent the priority message 212, resend the priority message 212 to the P-CSCF 110.

The P-CSCF 110 can also, upon receiving a priority message 212 with a priority indicator 208 for a UE 102, implement priority services for the UE 102 and/or prioritize traffic for the UE 102. For example, if the P-CSCF 110 receives a priority message 212 with a priority indicator 208 such as "Service-priority=0, namespace=WPS," the P-CSCF 110 can be configured to determine from that priority indicator 208 that the UE 102 should be given a service priority level of 0 and that the UE 102 is associated with a WPS user, and can respond by prioritizing services for the UE 102 based on that service priority level and/or status of the user as a WPS user. The P-CSCF 110 can also store data about the service priority level, status of the user, and/or any other priority data about the UE 102 or an associated user that was conveyed in the priority indicator 208 for future use when processing data for the UE 102.

As an example, the P-CSCF 110 can implement a prioritized admission control for the UE 102, such that when the P-CSCF 110 is congested, the P-CSCF 110 admits the UE 102 in response to the priority message 212 but may deny admission to other UEs 102 for which a priority message 212 was not received.

As another example, the P-CSCF 110 can respond to a priority message 212 for a UE 102 by setting up a bearer with a high priority flag for the UE 102. For instance, the P-CSCF 110 can cause the IMS 108 to set up a dedicated bearer with Quality of Service (QoS) parameters that would prioritize transmission of traffic for the UE 102 via that dedicated over other types of traffic. In some cases, the P-CSCF 110, based on the priority message 212, can trigger a Policy and Charging Rules Function (PCRF) with a priority flag, such that the PCRF can provide rules applicable to bearers for WPS users or other priority users.

As another example, the P-CSCF 110 can respond to a priority message 212 for a UE 102 by setting up dedicated resources with an Access Transfer Gateway (ATGW), a gateway where IMS media traffic for the UE 102 can be anchored. Accordingly, if traffic for a WPS user needs to be switched between a packet-switched access network and a circuit-switched access network during an emergency, the dedicated resources set up with the ATGW in response to the priority message 212 can allow that switch to be more likely to succeed.

As another example, if the UE 102 later sends the P-CSCF 110 a SIP INVITE message during an attempt to initiate a call to another UE 102, the P-CSCF 110 can, based on having received a priority message 212 for that UE 102, modify header and/or other data in the SIP INVITE message to indicate that the UE 102 is associated with a high service priority level. For instance, although the UE 102 may not have indicted in the INVITE message that the UE 102 is associated with a WPS user, the P-CSCF 110 can add a priority flag and/or priority header to the INVITE message that indicates a resource priority, service priority level, and/or user type such as "WPS." The P-CSCF 110 can then forward the modified INVITE message to the S-CSCF 114 or other network element, which can route or process the INVITE message in a prioritized manner based on the inserted priority flag and/or priority header. The P-CSCF 110 itself can, having received a priority message 212 for a particular UE 102 indicating that the UE 102 is associated with a WPS user or other priority user, prioritize processing SIP INVITE messages and other messages associated with that UE 102 over other UEs 102 that have not been identified as being associated with priority users.

Although FIG. 2 depicts the S-CSCF 114 transmitting both a priority message 212 and a registration confirmation message 210 to a P-CSCF 110 in response to receipt of a user profile answer 206 from the HSS 116 as part of an IMS registration process for a UE 102, in other examples the S-CSCF 114 may send a priority message 212 to the P-CSCF 110 after the UE 102 has already registered with the IMS 108. For example, if the S-CSCF 114 initially sends a user profile request 204 to the HSS 116 during the IMS registration process, but the user profile answer 206 returned by the HSS 116 does not include a priority indicator 208, the S-CSCF 114 may send just the registration confirmation message 210 to the P-CSCF 110. However, the S-CSCF 114 may later send a second user profile request 204 to the HSS 116 and receive back a second user profile answer 206 that does include a priority indicator 208, for example if a user's subscription or profile changed after IMS registration such that a user associated with the UE 102 is now considered a WPS user or other high priority user. In this situation, the S-CSCF 114 can send a priority message 212 to the P-CSCF 110 to inform the P-CSCF 110 that the UE 102 is now associated with a high priority user. Similarly, if a user's profile changes from indicating that a user is a high priority user to indicating that the user is a regular user after IMS registration, the S-CSCF 114 may send a priority message 212, or other similar message, with a priority indicator 208 informing the P-CSCF 110 that the user is no longer a high priority user.

Example Architecture

Figure 3:
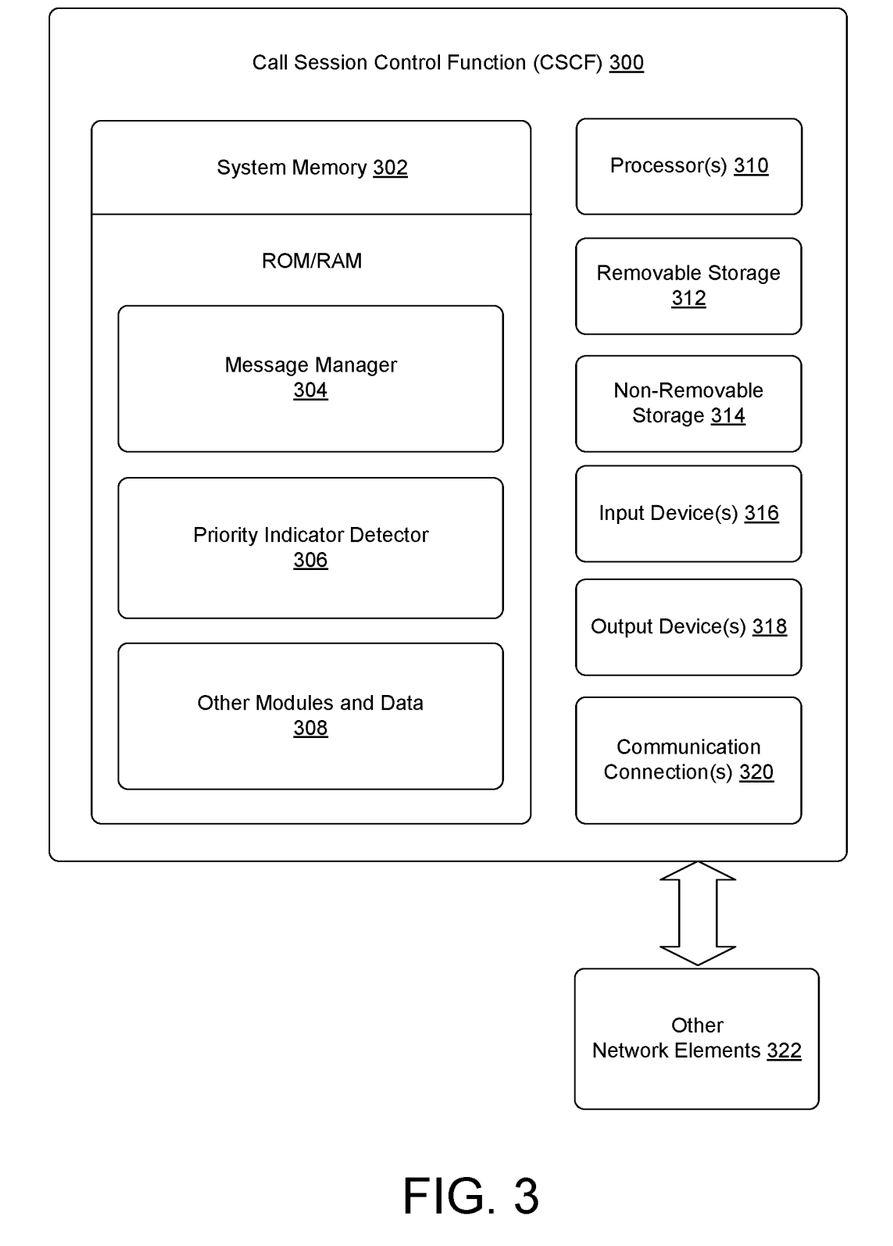
FIG. 3 depicts an example system architecture of a Call Session Control Function (CSCF) of an IMS.

FIG. 3 depicts an example system architecture of a Call Session Control Function (CSCF) 300 of an IMS 108. In some examples, the CSCF 300 shown in FIG. 3 can be an S-CSCF 114. In other examples, the CSCF 300 shown in FIG. 3 can be a P-CSCF 110.

The CSCF 300 can be, or run on, a computing device that has a system memory 302. The system memory 302 can store data for the CSCF 300, including a message manager 304, a priority indicator detector 306, and/or other modules and data 308. The computing device of the CSCF 300 can also include processor(s) 310, removable storage 312, non-removable storage 314, input device(s) 316, output device(s) 318, and/or communication connections 320 for communicating with other network elements 322.

In various examples, system memory 302 can be volatile (such as RAM), nonvolatile (such as ROM, flash memory, etc.), or some combination of the two. Example system memory 302 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The message manager 304 can receive, forward, modify, and/or generate messages that the CSCF 300 exchanges with other network elements 322. For example, when the CSCF 300 is an S-CSCF 114, the message manager 304 can receive a register message 202 from a P-CSCF 110, and in response generate and send a user profile request 204, such as a SAR, to the HSS 116. The message manager 304 of an S-CSCF 114 can also receive a user profile answer 206, such as an SAA, from the HSS 116, and return a registration confirmation message 210, such as a "200 OK" message, to the P-CSCF 110. When a priority indicator detector 306 of the S-CSCF 114 determines that the user profile answer 206 includes a priority indicator 208, the message manager of the S-CSCF 114 can also generate a priority message 212 that includes a corresponding priority indicator, and can send the priority message 212 to the P-CSCF 110.

As another example, when the CSCF 300 is a P-CSCF 110, the message manager 304 can receive a register message 202 from a UE 102, forward the register message 202 to an S-CSCF 114, and receive a registration confirmation message 210 from the S-CSCF 114 in response. In some situations, the message manager 304 of a P-CSCF 110 can separately receive a priority message 212 from the S-CSCF 114, apart from the registration confirmation message 210. If the message manager 304 of the P-CSCF 110 receives a priority message 212 from the S-CSCF 114, the message manager 304 of the P-CSCF 110 can return a priority confirmation message 214 to the S-CSCF 114.

The priority indicator detector 306 can determine whether a message received by the CSCF 300 includes a priority indicator 208. In some examples, the priority indicator detector 306 can be configured with a high priority trigger value, a priority text string, a priority code, and/or other data that can indicate that information in a received message is a priority indicator 208. For example, a priority indicator detector 306 of an S-CSCF 114 can be configured to look for a high priority trigger value, such as SPL=0, in a user profile answer 206 received from an HSS 116, and determine that the user profile answer 206 includes a priority indicator if an SPL value in the user profile answer 206 matches that high priority trigger value. As another example, when a message manager 304 of a P-CSCF 110 receives a priority message 212, the message manager 304 can cause a priority indicator detector 306 of the P-CSCF 110 to locate a priority indicator 208 included in the priority message 212 and determine a service priority level, a subscriber type, and/or other priority information associated with a UE 102 that is conveyed by the priority indicator 208.

When the priority indicator detector 306 determines that a received message includes a priority indicator 208, the priority indicator detector 306 can cause the message manager 304 or other elements of the CSCF 300 to perform one or more responsive actions. For example, when a priority indicator detector 306 of an S-CSCF 114 determines that a user profile answer 206 received from an HSS 116 includes a priority indicator 208, based on data in the user profile answer 206 matching a high priority trigger value or other trigger data, the priority indicator detector 306 can cause a message manager 304 of the S-CSCF 114 to generate a priority message 212 that includes a corresponding priority indicator 208. As another example, when a priority indicator detector 306 of a P-CSCF 110 locates a priority indicator 208 in a priority message 212 received from an S-CSCF 114 and determines a service priority level, a subscriber type, and/or other priority information associated with a UE 102 that is conveyed by the priority indicator 208, the priority indicator detector 306 can cause the P-CSCF 110 to implement corresponding prioritized services for the UE 102 at the P-CSCF 110 and/or other network elements 322. For instance, the priority indicator detector 306 can indicate to the message manager 304 of the P-CSCF 110 that a priority indicator 208 in the priority message 212 indicates that a UE 102 is associated with a WPS user. The message manager 304 can then respond by generating and sending messages to a PCRF and/or ATGW that result in the telecommunication network prioritizing traffic for the UE 102 based on the UE 102 being associated with a WPS user.

The other modules and data 308 can be utilized by the CSCF 300 to perform or enable performing any action taken by the CSCF 300. The other modules and data 308 can include a platform and applications, and data utilized by the platform and applications.

In some examples, the processor(s) 310 can be a central processing unit (CPU), a graphics processing unit (GPU), both CPU and GPU, or other processing unit or component known in the art.

The computing device of the CSCF 300 can also include additional data storage devices (removable and/or non-removable) such as, for example, magnetic disks, optical disks, or tape. Such additional storage is illustrated in FIG. 3 by removable storage 312 and non-removable storage 314. Computer storage media may include volatile and nonvolatile, removable and non-removable media implemented in any method or technology for storage of information, such as computer readable instructions, data structures, program modules, or other data. System memory 302, removable storage 312 and non-removable storage 314 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the CSCF 300. Any such computer-readable storage media can be part of the CSCF 300. In various examples, any or all of system memory 302, removable storage 312, and non-removable storage 314, store programming instructions which, when executed, implement some or all of the herein-described operations of the CSCF 300.

In some examples, the computing device of the CSCF 300 can also have input device(s) 316, such as a keyboard, a mouse, a touch-sensitive display, voice input device, etc., and/or output device(s) 318 such as a display, speakers, a printer, etc. These devices are well known in the art and need not be discussed at length here.

The computing device of the CSCF 300 can also contain communication connections 320 that allow the CSCF 300 to communicate with other network elements 322, such as UEs 102, application servers, other CSCFs 300, PCRFs, ATGWs, an HSS 116, and/or any other elements of the telecommunication network. For example, the communication connections 320 can allow the CSCF 300 to send and receive SIP messages, such as a register message 202, a registration confirmation message 210, a priority message 212, a priority confirmation message 214, an invite message, and/or other types of SIP messages. When the CSCF 300 is an S-CSCF 114, the communication connections 320 can also allow the S-CSCF 114 to exchange messages with the HSS 116 using a Diameter protocol interface, including a SAR sent as a user profile request 204 and an SAA sent as a user profile answer 206. When the CSCF 300 is a P-CSCF 110, the communication connections 320 can also allow the P-CSCF 110 to exchange messages with a PCRF, an ATGW, and/or other network elements.

Example Operations

Figure 4:
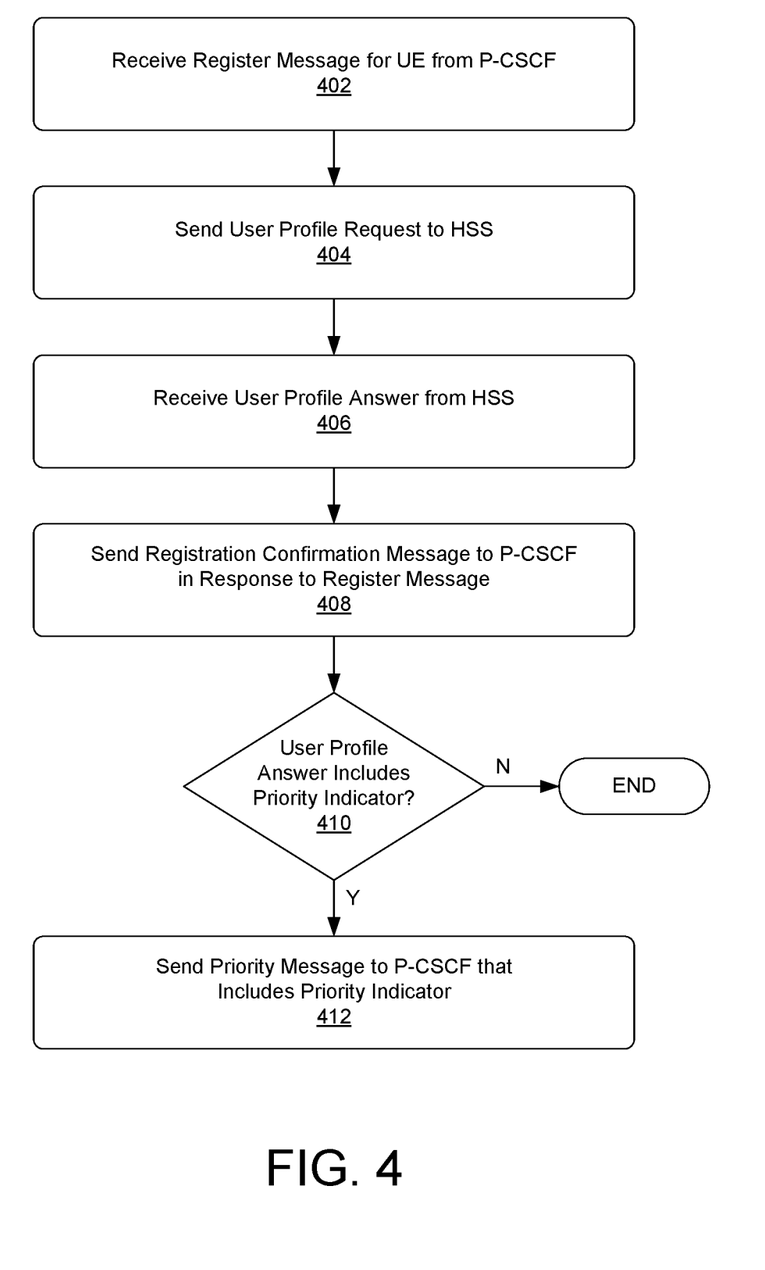
FIG. 4 depicts a flowchart of a method by which a Serving CSCF (S-CSCF) of an IMS can determine whether to send a priority message to a Proxy CSCF (P-CSCF) of the IMS.

FIG. 4 depicts a flowchart of a method by which an S-CSCF 114 of an IMS 108 can determine whether to send a priority message 212 to a P-CSCF 110 of the IMS 108.

At block 402, the S-CSCF 114 can receive a register message 202 from the P-CSCF 110. The register message 202 may have originated from a UE 102 that is attempting to register with the IMS 108, and the P-CSCF 110 can have forwarded the register message 202 to the S-CSCF 114.

At block 404, the S-CSCF 114 can send a user profile request 204 to an HSS 116. The user profile request 204 can be a request, such as a SAR, for user profile information associated with the UE 102 that originated the register message 202. At block 406, the S-CSCF 114 can receive a user profile answer 206, such as an SAA, from the HSS 116 that includes the user profile information associated with the UE 102 that was requested by the user profile request 204. In some examples, the S-CSCF 114 and the HSS 116 can exchange the user profile request 204 and the user profile answer 206 using a Diameter protocol interface, such as a Cx interface. In some examples, the S-CSCF 114 may also authenticate the UE 102 with the HSS 116 and/or register the UE 102 with the IMS 108 after receiving the register message 202 at block 402.

At block 408, the S-CSCF 114 can send a registration confirmation message 210 to the P-CSCF 110, as a response to the register message 202 received at block 402. The registration confirmation message 210 can, for example, be a "200 OK" message sent to confirm that the S-CSCF 114 has registered the UE 102 with the IMS 108. The P-CSCF 110 may, in turn, forward the registration confirmation message 210 to the UE 102.

At block 410, the S-CSCF 114 can determine if the user profile answer 206 received from the HSS 116 at block 406 includes a priority indicator 208. For example, the S-CSCF 114 can be configured to determine that the user profile answer 206 includes a priority indicator 208 when data in the user profile answer 206 matches a high priority trigger value, a priority text string, a priority code, and/or other priority trigger data.

If the S-CSCF 114 does determine at block 410 that the user profile answer 206 includes a priority indicator 208, the S-CSCF 114 can send a priority message 212 to the P-CSCF 110 that includes the same, or a similar, priority indicator 208. For example, if the user profile answer 206 includes a priority indicator 208 such as: "SPL=0; EP=' Service-priority=0, namespace=WPS'," at block 410 the S-CSCF 114 can recognize the SPL=0 value in the user profile answer 206 as matching a high priority trigger value and thus that the user profile answer 206 includes a priority indicator 208. In some examples, at block 412, the S-CSCF 114 can use at least a portion of the priority indicator 208 from the user profile answer 206, such as "Service-priority=0, namespace=WPS," as a priority indicator 208 of a priority message 212, and can send the priority message 212 to the P-CSCF 110. The P-CSCF 110 can be configured to respond to the priority message 212 by implementing priority services for the UE 102 based on the priority indicator 208. The S-CSCF 114 may also receive a priority confirmation message 214 from the P-CSCF 110 as a reply to the priority message 212.

However, if the S-CSCF 114 does not determine at block 410 that the user profile answer 206 includes a priority indicator 208, the process may end without the S-CSCF 114 sending a priority message 212 to the P-CSCF 110. Accordingly, in this situation. the P-CSCF 110 may receive the registration confirmation message 210 the S-CSCF 114 sent at block 408, but not receive a separate priority message 212 from the S-CSCF 114. The P-CSCF 110 can be configured to respond to the lack of a separate priority message 212 associated with the UE 102 by implementing services for the UE 102 using a default processing scheme for non-priority users.

In some examples, the S-CSCF 114 can perform blocks 404, 406, 410, and/or 412 outside an IMS registration process. For example, after an initial IMS registration process for a UE 102, the S-CSCF 114 may perform blocks 404 and 406 to obtain a subsequent user profile answer 206. If that subsequent user profile answer 206 is different than a previously-obtained user profile answer 206, for example if the subsequent user profile answer 206 includes a priority indicator 208 and a previous user profile answer 206 did not, thereby indicating that the corresponding user's profile or subscription has changed after IMS registration, the S-CSCF 114 can detect that change at block 410. The S-CSCF 114 can accordingly send a priority message 212 to the P-CSCF 116 at block 412 based on receipt of the subsequent user profile answer 206, even if the UE 102 had already previously registered with the IMS 108.

Figure 5:
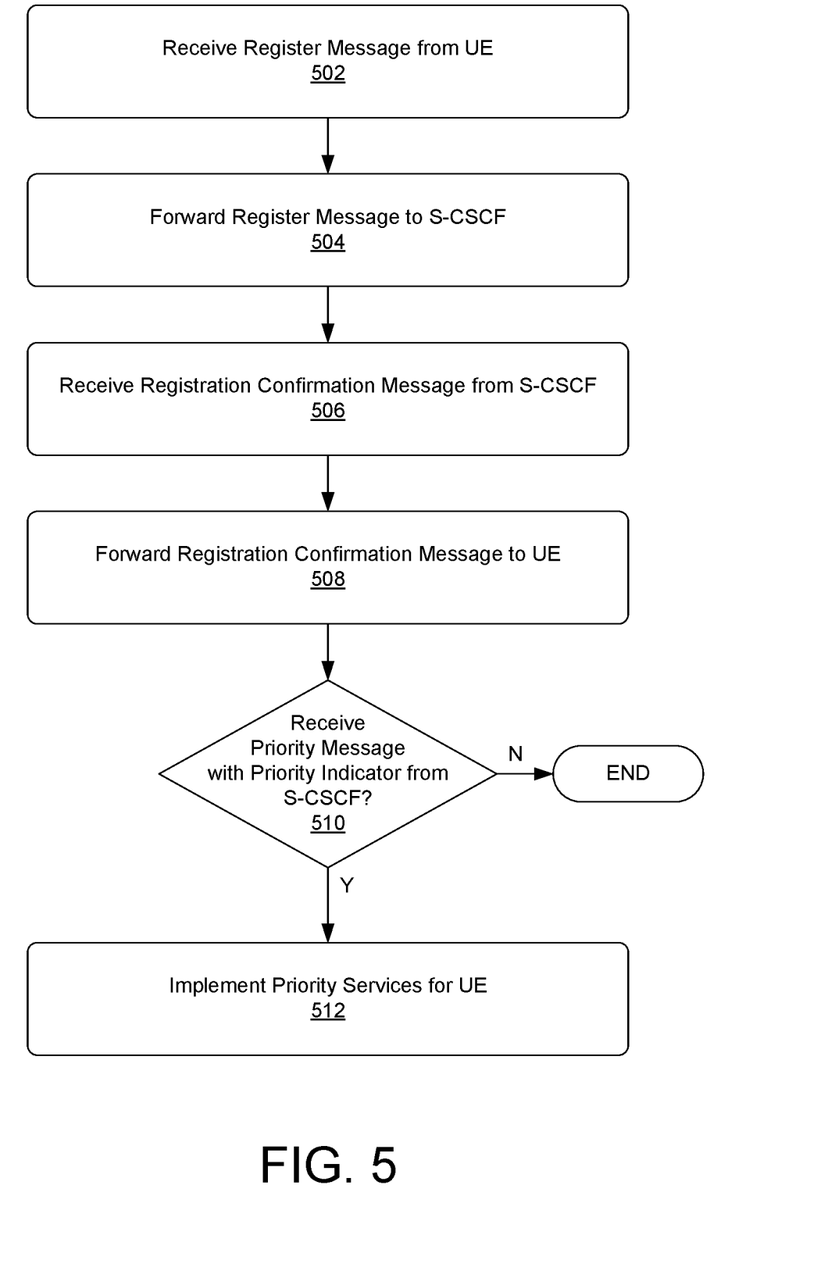
FIG. 5 depicts a flowchart of a method by which a P-CSCF of an IMS can prioritize services for a UE in response to receiving a priority message about the UE from an S-CSCF of the IMS.

FIG. 5 depicts a flowchart of a method by which a P-CSCF 110 of an IMS 108 can prioritize services for a UE 102 in response to receiving a priority message 212 about the UE 102 from an S-CSCF 114 of the IMS 108.

At block 502, the P-CSCF 110 can receive a register message 202 from a UE 102. The UE 102 can have sent the register message 202 in an attempt to register with the IMS 108. At block 504, the P-CSCF 110 can in turn forward the register message 202 to an S-CSCF 114. In some examples, the register message 202 can be passed through one or more intermediate elements between the P-CSCF 110 and the S-CSCF 114. For example, the P-CSCF 110 can send the register message 202 to an I-CSCF 112 instead of to the S-CSCF 114 directly, and the I-CSCF 112 can consult with an HSS 116 to select an S-CSCF 114 for the UE 102, and then forward the register message 202 to the selected S-CSCF 114.

At block 506, the P-CSCF 110 can receive a registration confirmation message 210, such as a "200 OK" message, from the S-CSCF 114 in response to the register message 202 the P-CSCF 110 forwarded to the S-CSCF 114 at block 504. At block 508, the P-CSCF 110 can forward the registration confirmation message 210 to the UE 102.

After the P-CSCF 110 receives the registration confirmation message 210, the P-CSCF 110 can be configured to implement services for the UE 102 under a default processing scheme for non-priority users under an assumption that the UE 102 is not associated with a WPS user or type other priority user, unless and until the P-CSCF 110 also receives a separate priority message 212 associated with that UE 102. Accordingly, at block 510, the P-CSCF 110 can determine if a separate priority message 212 associated with the UE 102 has also been received from the S-CSCF 114. If the P-CSCF 110 has not received a separate priority message 212 associated with the UE 102 in addition to the registration confirmation message 210, the process can end and the P-CSCF 110 can implement services for the UE 102 under the default processing scheme for non-priority users.

However, if at block 510 the P-CSCF 110 determines that a separate priority message 212 associated with the UE 102 has been received from the S-CSCF 114, the P-CSCF 110 can implement priority services for the UE 102 at block 512 based on the priority indicator 208 included in the priority message 212. For example, if the priority indicator 208 of the priority message 212 is a text string such as "Service-priority=0, namespace=WPS," the P-CSCF 110 can implement services associated with a service priority level of 0 and/or WPS users for the UE 102. Such priority services for the UE 102 can include prioritized admission control, setting up one or more bearers with a high priority flag, triggering a PCRF with a priority flag, setting up dedicated resources for the UE 102 with an ATGW, modifying and/or prioritizing processing of messages associated with the UE 102, and/or any other service that can correspond with a service priority level and/or priority user type identified by the priority indicator of the priority message 212.

In some examples, the P-CSCF 114 can perform blocks 510 and/or 512 outside an IMS registration process. For example, after an initial IMS registration process for a UE 102, the P-CSCF 114 may later receive a priority message 212 from the S-CSCF 114 that includes a priority indicator 208, for instance if a user's subscription changed post-registration with the IMS 108 to reflect that the user is a WPS user or other high-priority user. The P-CSCF 114 can accordingly receive the later priority message 212 associated with the UE 102 at block 510 and implement priority services for the UE 102 at block 512, even if the UE 102 had already previously registered with the IMS 108.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   receiving, by a serving call session control function (S-CSCF) of an Internet Protocol Multimedia Subsystem (IMS), a register message for a user equipment (UE) from a proxy call session control function (P-CSCF) of the IMS;
   sending, by the S-CSCF, a user profile request associated with the UE to a Home Subscriber Server (HSS);
   receiving, by the S-CSCF, a user profile answer associated with the UE from the HSS; and
   in response to the register message,
     sending, by the S-CSCF, a registration confirmation message associated with the UE to the P-CSCF,
     determining, by the S-CSCF, that the user profile answer includes a priority indicator that indicates that a user associated with the UE is a Wireless Priority Service (WPS) user, wherein the determining includes finding, by the S-CSCF, a service priority level value in the user profile answer and determining, by the S-CSCF, that the service priority level value matches a predetermined priority trigger value associated with a priority user type, and
     sending, by the S-CSCF in response to the determining, a priority message associated with the UE to the P-CSCF.

2. The method of claim 1, wherein the priority indicator identifies at least one of a service priority level value or a namespace associated with a user associated with the UE.

3. The method of claim 2, further comprising inserting, by the S-CSCF, the at least one of the service priority level value or the namespace in the priority message.

4. The method of claim 1, wherein the S-CSCF includes at least a portion of the priority indicator in the priority message.

5. The method of claim 1, wherein the registration confirmation message is a Session Initiation Protocol (SIP) response message including a "200 OK" response code, and the priority message is a request sent by the S-CSCF using a SIP MESSAGE method.

6. The method of claim 1, wherein the user profile request is sent by the S-CSCF to the HSS after the HSS sends the registration confirmation message to the P-CSCF, and the priority indicator in the user profile answer reflects changes to a user profile associated with the UE at the HSS that occurred after the UE registered with the IMS.

7. A serving call session control function (S-CSCF) of an Internet Protocol Multimedia Subsystem (IMS), comprising:
one or more processors;
memory storing computer-executable instructions that, when executed by the one or more processors, cause the S-CSCF to perform operations comprising:
receiving a register message for a user equipment (UE) from a proxy call session control function (P-CSCF) of the IMS;
sending a user profile request associated with the UE to a Home Subscriber Server (HSS);
receiving a user profile answer associated with the UE from the HSS;
sending a registration confirmation message associated with the UE to the P-CSCF;
determining that the user profile answer includes a priority indicator that indicates that a user associated with the UE is a Wireless Priority Service (WPS) user, wherein the determining includes finding, by the S-CSCF, a service priority level value in the user profile answer and determining, by the S-CSCF, that the service priority level value matches a predetermined priority trigger value associated with a priority user type; and
sending, in response to the determining, a priority message associated with the UE to the P-CSCF.

8. The S-CSCF of claim 7, wherein the priority indicator identifies at least one of a service priority level value or a namespace associated with a user associated with the UE.

9. The S-CSCF of claim 8, further comprising inserting the at least one of the service priority level value or the namespace in the priority message.

10. The S-CSCF of claim 7, wherein at least a portion of the priority indicator is included in the priority message.

11. The S-CSCF of claim 7, wherein the registration confirmation message is a Session Initiation Protocol (SIP) response message including a "200 OK" response code, and the priority message is a request sent using a SIP MESSAGE method.

12. One or more non-transitory computer-readable media storing computer-executable instructions that, when executed by one or more processors of a serving call session control function (S-CSCF) of an Internet Protocol Multimedia Subsystem (IMS), cause the S-CSCF to perform operations comprising:
receiving a register message for a user equipment (UE) from a proxy call session control function (P-CSCF) of the IMS;
sending a user profile request associated with the UE to a Home Subscriber Server (HSS);
receiving a user profile answer associated with the UE from the HSS;
sending a registration confirmation message associated with the UE to the P-CSCF;
determining that the user profile answer includes a priority indicator that indicates that a user associated with the UE is a Wireless Priority Service (WPS) user, wherein the determining includes finding, by the S-CSCF, a service priority level value in the user profile answer and determining, by the S-CSCF, that the service priority level value matches a predetermined priority trigger value associated with a priority user type; and
sending, in response to the determining, a priority message associated with the UE to the P-CSCF.

13. The one or more non-transitory computer-readable media of claim 12, wherein the priority indicator identifies at least one of a service priority level value or a namespace associated with a user associated with the UE.

14. The one or more non-transitory computer-readable media of claim 12, wherein at least a portion of the priority indicator is included in the priority message.

* * * * *